United States Patent [19]
Holmes

[11] Patent Number: 5,668,852
[45] Date of Patent: Sep. 16, 1997

[54] AUTOMATIC CALLER-ASSOCIATED INFORMATION PROVISION SYSTEM, IMPROVEMENT AND METHOD FOR PAGING SYSTEM

[76] Inventor: Terry M. Holmes, 13250 Clairepointe Way, Oakland, Calif. 94619-3507

[21] Appl. No.: 749,412

[22] Filed: Nov. 15, 1996

Related U.S. Application Data

[63] Continuation of Ser. No. 375,394, Jan. 18, 1995, abandoned.
[51] Int. Cl.$^6$ ............... H04Q 7/06; H04Q 7/10; H04Q 7/16
[52] U.S. Cl. ............ 405/31.2; 379/1; 379/142; 340/825.44; 340/311.1
[58] Field of Search ............... 379/56, 57, 142; 340/825.44, 311.1

[56] References Cited

U.S. PATENT DOCUMENTS

| | | | |
|---|---|---|---|
| 4,680,785 | 7/1987 | Akiyama et al. | |
| 4,942,598 | 7/1990 | Davis | 379/57 |
| 5,325,424 | 6/1994 | Grube | |
| 5,327,486 | 7/1994 | Wolff et al. | 379/96 |
| 5,459,458 | 10/1995 | Richardson et al. | 340/825.44 |
| 5,502,761 | 3/1996 | Duncan et al. | 379/142 |
| 5,561,702 | 10/1996 | Lipp et al. | 379/57 |
| 5,604,492 | 2/1997 | Abdul-Halim | 340/825.44 |

OTHER PUBLICATIONS

Jul. 1994 Article—*Electronics Now* "Take Back Control of Your Telephone".
Advertisement—Bel-Tronics Caller ID LCD.
Advertisement—Direct Phone, Selected Phone and Free Phone.
Advertisement—Bravo Plus Numeric Display Pager.
Advertisement—Air Touch Cellular Display Messaging.
Advertisement—Motorola "So, how do I get into the Paging Business".
Dialogic Corporation—Use of Dialogic Components in Automatic . . . .
Dialogic Corporation—Use of Dialogic UNIX Voice Drive for High . . . .
Dialogic Corporation—Ordering Service and Installing Equipment . . . .
Dialogic Corporation—Why is T-1 Important and How Can It Be Used.
Dialogic Corporation—Use of Dialogic T-1 In Telephone Company . . . .
Dialogic Corporation—Collecting Caller ID With the D/42-NS.

*Primary Examiner*—William Cumming
*Assistant Examiner*—Nay Maung
*Attorney, Agent, or Firm*—Kolisch, Hartwell, Dickinson, McCormack & Heuser

[57] ABSTRACT

Caller-associated information (CAI) may include various data such as names, addresses, telephone numbers, demographic information, messages, other like information and, most preferably, the caller's telephone number. The system includes telephone line-connected telephone answering equipment, decoding equipment and paging equipment. The telephone answering equipment answers or responds to a telephone call originated by a caller. This telephone call includes a datum (such as an identification of the caller's telephone number) and an indication of an intended pager telephone number. The number dialed by the caller to access the system indicates the intended pager telephone number and the appropriate datum transmission can be used to identify the caller's telephone number. The decoding equipment is operatively connected to the answering equipment and it monitors the telephone line to detect and decode (i.e., extract) datum from the datum transmission. Operatively connected to the decoding equipment is the paging equipment which is for communicating the decoded datum and any other information to the intended pager. One preferred method includes monitoring an incoming call to pager from a caller, extracting datum from the call's datum transmission (such datum may include the caller's telephone number), communicating with paging system, and sending the datum and/or other CAI within the paging system. Another preferred method includes a test to determine if the caller fails to enter the appropriate type of information, before automatically sending the datum and/or CAI within the paging system so that it may be forwarded to the pager.

15 Claims, 4 Drawing Sheets

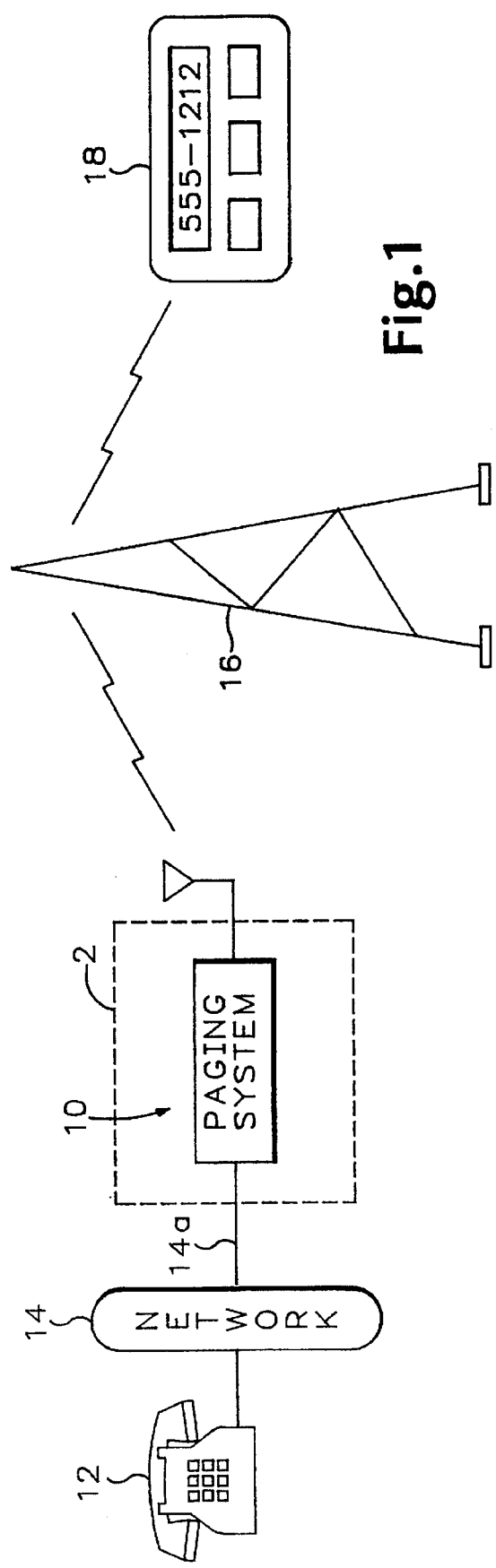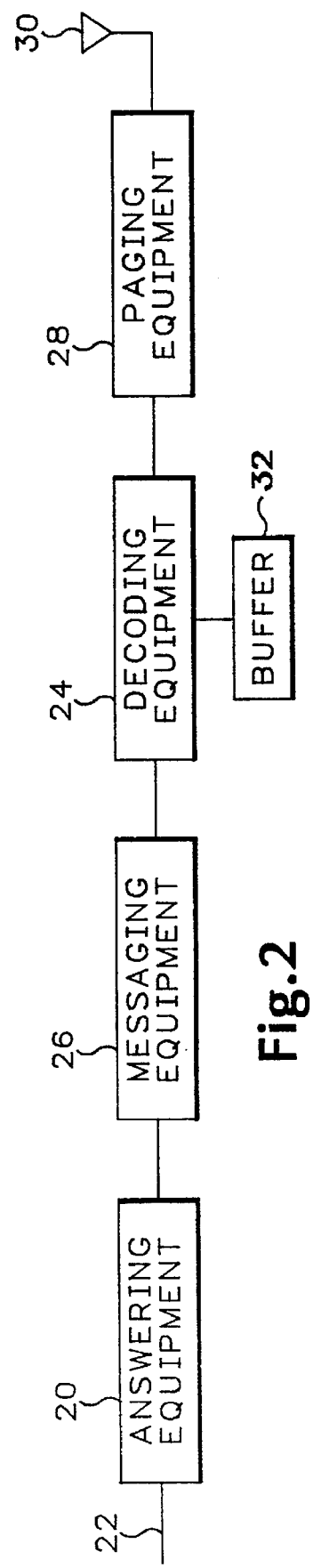

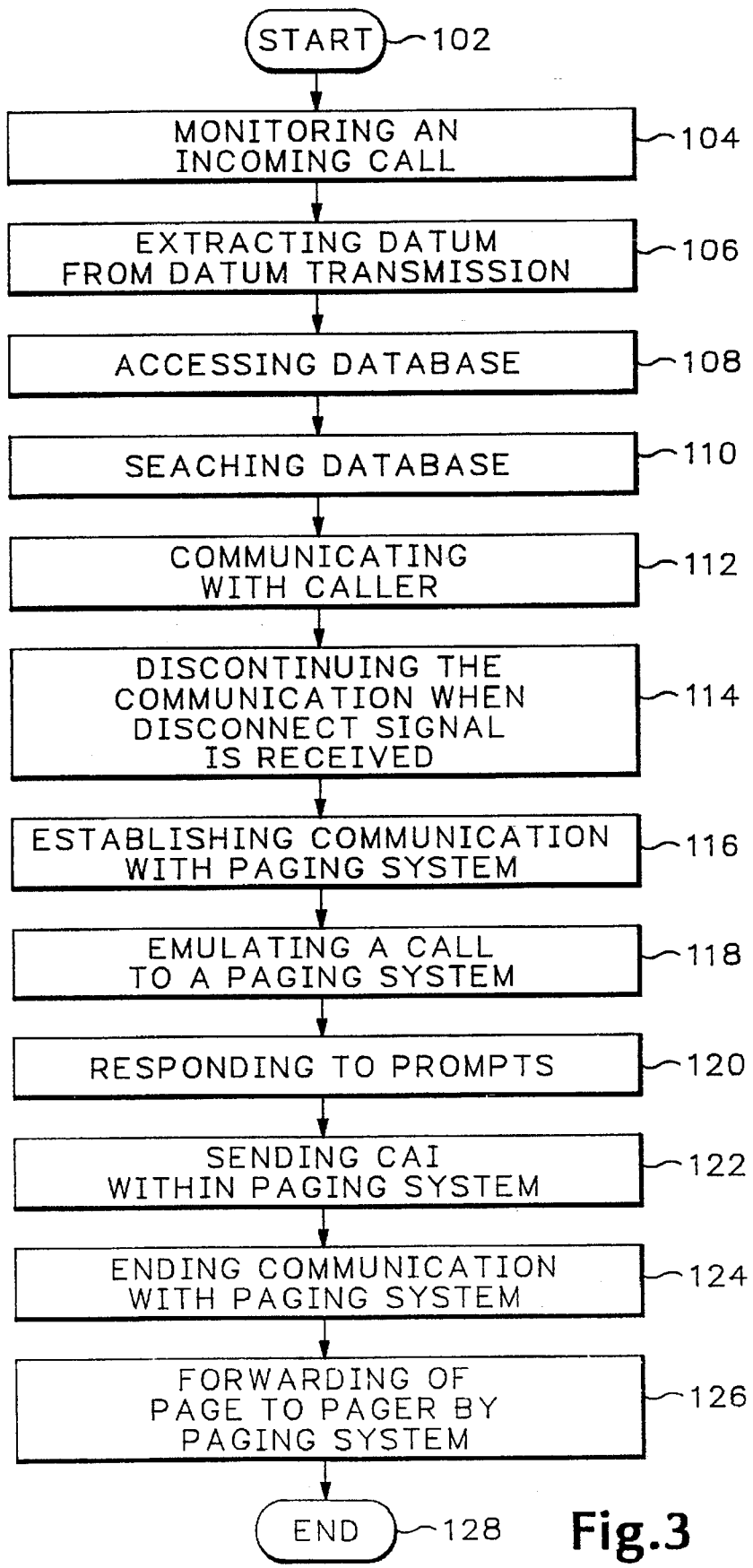

AUTOMATIC CALLER-ASSOCIATED INFORMATION PROVISION SYSTEM, IMPROVEMENT AND METHOD FOR PAGING SYSTEM

This is a continuation of application Ser. No. 08/375,394 filed Jan. 18, 1995, now abandoned.

FIELD OF THE INVENTION

The present invention relates generally to paging systems and pagers. More particularly, the invention concerns a system, an improvement and a method related to the automatic providing of information associated with a telephone caller to a paging system when the caller directs a call to a pager.

BACKGROUND OF THE INVENTION

Pager Background:

In the information age, paging devices or portable radio pagers are commonly used by people who need to stay in touch at all times. People wear pagers anywhere on their person that beep, vibrate, play a tune, or otherwise indicate when the person wearing the pager is being paged. The paging subscriber who is wearing a pager obtains the pager and contracts with a paging company to provide a paging service so that the service automatically signals the subscriber when a caller calls a designated telephone number (and occasionally additional codes) associated with the pager worn by the subscriber.

A typical paging system includes a paging terminal which connects to the public telephone network and one or more paging transmitters. The paging transmitters communicate to radio pagers via a radio link. When a caller calls a pager, the caller dials a designated telephone number and responds to prompts generated by the paging service. Typically, such prompts are voice synthesized instructions. In so responding, the caller usually enters the telephone number of a telephone where the caller will be available to receive a return call from the subscriber. A caller makes such an entry by pressing keys on the numeric keypad of a touch-tone telephone. The paging service forwards the caller-entered number with the page to the subscriber via radio transmission. Most often, the caller-entered number is the phone number of the telephone from which the caller is making the call to the pager.

When the pager receives the page, it signals the subscriber indicating that a page has been received and displays the caller-entered number on the pager's LCD. Usually, a pager signals by using an audible tone or quiet vibration. The subscriber then finds a nearby phone to call the displayed number to talk to the caller. Usually, subscribers are the type of people who deal in information that has a time-sensitive value. If the caller inadvertently entered the wrong number or failed to enter a number at all, the subscriber may never know who sent the page or why the page was sent. This problem may have a serious impact on the time-sensitive value of the information, which could lead to a significant loss.

Also, a pager with an alphanumeric LCD, or simply an alpha pager, can display information beyond a telephone number. The alpha pagers can display a wide variety of information transmitted by the paging services to the alpha pagers. Such information may include the caller's name and address, other telephone numbers, or perhaps a short message.

ANI Background:

Automatic Number Identification (ANI) is a telephone network feature that causes a local telephone switching system to send a caller's telephone number to other offices or to network switching systems. A caller is any activated, telephone-line connected, dialing-capable device with an assigned telephone number. A caller can be a person using a telephone, a computer using a modem, a fax machine, a burglar alarm and/or fire alarm system, etc. Caller-ID is the common name of the version of the ANI service that is available to residential customers from the local telephone company. In addition, ANI service is offered to commercial customers by long distance companies. A known use of the ANI service is the automation of the process of billing or routing a telephone call. Local Exchange Carriers use ANI for Centralized Automatic Message Accounting (CAMA), which is used to issue individual phone bills to subscribers.

The calling party station identification (i.e., telephone number associated with the caller) can be delivered either in-band, in the form of dual-tone multifrequency (DTMF) or multifrequency (MF) signals, or out-of-band, with Integrated Services Digital Network based (ISDN-based) services. Although the actual ANI transmission (or signal) format differs slightly from carrier to carrier, the basic format is KP+I+(7 or 10 digits)+ST where KP=key pulse;

I=information digit;

(7 or 10 digits)=caller's telephone number; and

ST=start signal.

SUMMARY OF THE PREFERRED EMBODIMENTS OF THE INVENTION

The invention is a system, an improvement, and a method of automatically providing caller-associated information (CAI) to a paging system. CAI may include various data such as names, addresses, telephone numbers, codes signifying various information, demographic information, messages, other like information and preferably, the caller's telephone number. The system and improvement thereof includes telephone line-connected telephone answering equipment, decoding equipment, messaging or annunciating equipment and paging equipment. The telephone answering equipment answers or responds to a telephone call originated by a caller. This telephone call includes at least one datum and an indication of an intended pager telephone number. The number dialed by the caller to access the system indicates the intended pager telephone number and the appropriate datum transmission can be used to identify the caller's telephone number.

The system and the improvement thereof includes decoding equipment operatively connected to the answering equipment that monitors the telephone line to detect and decode (i.e., extract) the datum from the datum transmission. Operatively connected to the decoding equipment is the paging equipment for communicating the decoded datum and any other information with the page to the intended pager. Also, operatively connected to the decoding equipment is the messaging or annunciating equipment for communicating with the caller.

One preferred method includes monitoring an incoming call from a caller to a pager, extracting the datum from the call's datum transmission, communicating with the paging system, and sending the datum and/or other CAI within the paging system so that it may be forwarded to the pager. Another preferred method includes a test to determine if the caller fails to enter the appropriate type of information, before automatically sending the datum and/or other CAI within the paging system so that the datum may be forwarded to the pager.

When the datum extracted is the caller's telephone number, the invention simplifies and accelerates the paging process, and it eliminates caller entry error because the caller does not need to enter the telephone number from which the caller is calling.

These and additional objects and advantages of the present invention will be more readily understood after a consideration of the drawings and the detailed description of the preferred embodiment.

BRIEF DESCRIPTION OF THE DRAWINGS

FIG. 1 is a general schematic diagram of the overall invented system shown in relation to the other elements of a simplified pager telephone network.

FIG. 2 is a schematic block diagram of the invented system and invented improvement thereof showing the components of a paging system (as taken from the phantom line box 2 of FIG. 1) and how the components interconnect.

FIG. 3 is a flowchart illustrating an aspect of the invented method.

DETAILED DESCRIPTION OF THE INVENTION

Figure 4A:
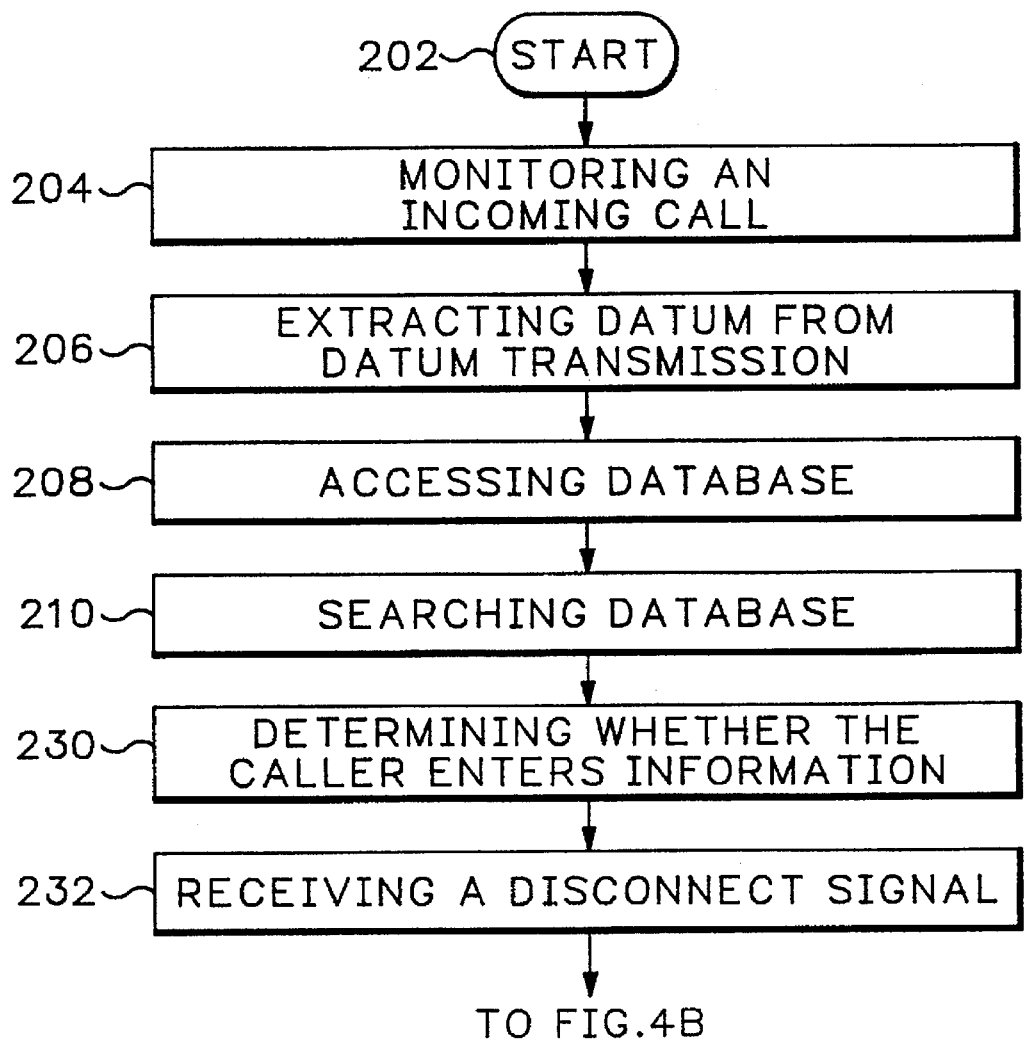
FIG. 4A and 4B is a flowchart illustrating another aspect of the invented method.
Figure 4B:
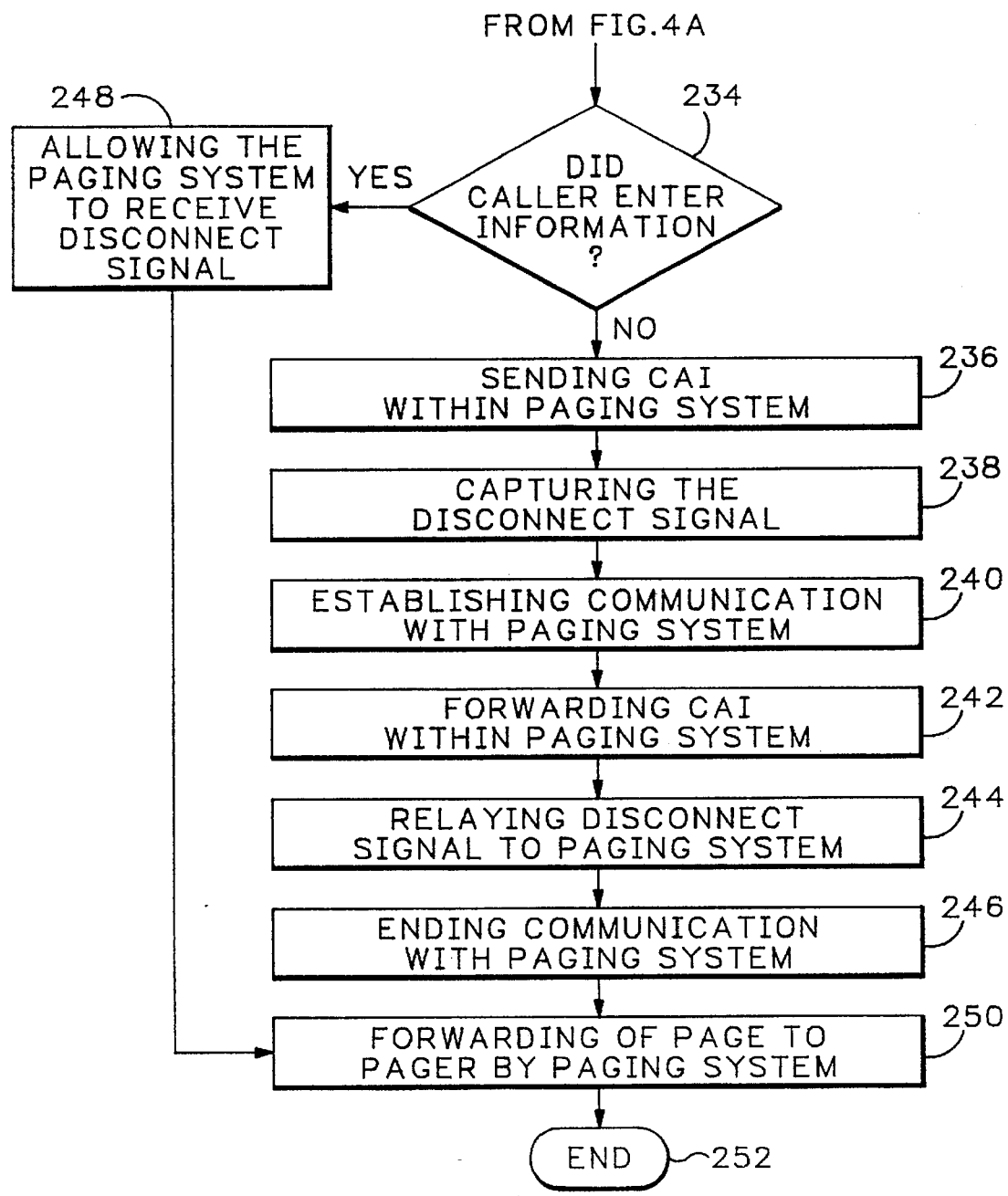

As seen collectively in FIGS. 1 and 2, the invented paging system and improvement thereof for automatically providing caller-associated information (CAI) to a paging system, made in accordance with the preferred embodiment of the invention, is shown at 10. In addition, FIGS. 3, 4A and 4B illustrate the invented method of automatically providing CAI to a paging system made in accordance with the preferred embodiments of the invention.

A simplified pager telephone network as shown in FIG. 1 includes a caller 12 (or calling party station, calling device, or telephone) connected to a telephone network 14 (local and/or long-distance telephone networks) which in turn is connected to a paging system 10 (inside phantom line box 2). The paging system communicates with one or more radio pagers 18 over a radio link and via one or more paging transmitters 16. Those who are skilled in the art will appreciate that caller 12 is not limited to a person using a telephone. For example, the caller may be a computer with a modem, a fax machine, a burglar and/or fire alarm system, telecommunications equipment, or the like.

The link 14a between telephone network 14 and the paging system may be a T-1 or T-3 line or service or other operative telephone links. A paging company or service, which owns and operates the paging system, receives one or more telephone links. When caller 12 calls a designated phone number for pager 18, the call is directed across telephone network 14 and over link 14a to paging system 10. The calls on multiple-telephone-line links are differentiated by so-called DINUS codes which are four-digit codes designating which pager is being called. A DINUS code is usually the last four digits of the pager's phone number.

As shown in FIG. 2, the paging system includes answering equipment 20, a telephone line 22, decoding equipment 24, messaging equipment 26, paging equipment 28, an antenna 30, and a buffer 32. Answering equipment 20 is operatively connected to telephone line 22 and is responsive to a telephone call originated by caller 12. The incoming telephone call across line 22 from caller 12 includes a datum transmission in which is included a datum associated with the incoming call. An example of such a datum transmission is an automatic number identification (ANI) transmission. Using ANI technology, a datum such as the caller's telephone number can be extracted from the ANI transmission.

The datum is extracted from the datum transmission by using decoding equipment 24. Operatively connected to the answering equipment, decoding equipment 24 monitors the telephone line to detect and decode the datum in the datum transmission. In the case of ANI, the decoding equipment extracts the caller's telephone number from the ANI transmission. Also, the datum may be temporarily stored in buffer 32 to be retrieved when needed.

Operatively attached to the decoding equipment is paging equipment 28 for communicating caller-associated information (CAI) to the intended pager. Paging equipment 28 includes standard equipment utilized by a paging service to transmit pages to specific pagers. This standard equipment includes a paging terminal with an antenna 30 linked with one or more paging transmitters that communicate via radio or electromagnetic waves to various radio pagers.

The caller-associated information (CAI) communicated by the paging equipment to the intended pager may include any information or data related to or associated with the caller. For example, the CAI may include the datum decoded or extracted from the incoming call and any information about the caller retrieved from a database search. Such a database search can be based on the datum extracted from the incoming call, datum provided by the user, the intended pager's phone number, or any other CAI. Another example of CAI is a special character (e.g., an asterisk) that can be coded and sent with the extracted telephone number to signify that the number was identified using ANI technology.

Paging system 10 also includes messaging or annunciating equipment 26 for communicating with the caller. For example, messaging equipment 26 also may indicate to the caller that the CAI has been communicated to the intended pager (or at least has been queued up to be sent to the intended pager) or that the datum has been successfully decoded or extracted. Messaging equipment 26 provides a means by which paging system 10 can communicate with caller 12. Usually, the communication consists of audible tones or synthesized voice messages. The communication may include paging system prompts. Such paging system prompts (including prompts generated by messaging equipment 26) generally ask the user to input information, such as the user's telephone number, and may inform the user that the user's number will be automatically identified if the user does not input a telephone number.

FIGS. 3, 4A and 4B show the preferred embodiments of the method of automatically providing caller-associated information (CAI) to a paging system. The appropriate telephone communication equipment and programmable computer equipment can be programmed via firmware, software or otherwise to perform the steps of the invented method. In each of the preferred embodiments shown in FIGS. 3 and 4, a caller originates an incoming telephone call to a designated pager through a paging system. The incoming call has accompanying datum embedded in a datum transmission. Preferably, the datum includes the caller's telephone number and the datum transmission is an ANI transmission. When the paging system is provided with the CAI—which includes the call's accompanying datum—by the invented method, the paging system forwards the CAI with a page to the designated pager.

At 102 of FIG. 3, the first preferred embodiment of the invented method starts. At 104, the first step after the start is to monitor or intercept an incoming call to a pager through a paging system. While a call is monitored, the datum is extracted at 106 from the datum transmission. Following the datum extraction, a computerized database is accessed at 108 and searched at 110. Such a search may be based on the datum extracted from the datum transmission. If any other CAI is found in the database, it is extracted and may be sent to the intended pager with the page. The next step is to communicate with the caller at 112. This communicating step preferably includes audible tones (such as voice synthesized messages) that give the caller information, instructions or directions. Such communication may include acknowledging the extraction of the datum or the successful sending of the CAI to the pager. At 114, the communication with the caller is discontinued or completed once a disconnect signal is received. Such disconnect signal indicates that the call is terminated (usually by the caller hanging up the phone).

If the method is performed by equipment which is logically or physically separated from the rest of the paging system, but operatively connected thereto (i.e., a front-end device), then communication is established at 116 with the paging system after the caller has terminated the call and a call to the paging system is emulated at 118 by responding to the appropriate prompts at 120 that are generated by the paging system. At 122, the CAI is sent to the paging system and the communication with the paging system is ended at 124. A front-end device using this method would preferably send information (such as the CAI) and respond to the paging system prompts using DTMF or similar codes, thereby simulating or emulating a caller inputting the information. Otherwise, simulating or emulating a caller is not necessary. Next, the paging system at 126 forwards the page including the CAI to the pager. The method ends at 128 but of course its steps may be repeated for subsequent calls to the paging system.

Another of the preferred embodiments of the invented method starts at 202 of FIG. 4A. An incoming call is monitored at 204 and the datum is extracted at 206 from the datum transmission. Preferably, such monitoring of the call does not prevent the paging system (or paging equipment) from recognizing the actual telephone call. Next at 208 and 210, a computerized database is accessed and searched. If any other CAI is found in the database, it is extracted and may be sent to the intended pager with the page.

At 230, the monitoring equipment (utilizing the present method) determines whether the caller enters a pre-specified type of information during the incoming telephone call, such as the caller's telephone number. When the caller hangs up or terminates the call, a disconnect signal is received at 232. Once the disconnect signal is received, a test is done to determine if the caller entered the correct type of information at 234 of FIG. 4B. If the caller did enter the correct type of information, then the paging system is allowed at 248 to recognize the disconnect signal, thereby ending the paging system's contact with the caller. The paging system forwards the page to the pager and the invented method ends at 252.

Otherwise, if the caller failed to enter or input the proper type of information before the call was terminated, the CAI is provided at 236 to the paging system. Providing the CAI within the paging system includes: 1) at 238, capturing the disconnect signal; 2) at 240, establishing communication with the paging system; 3) at 242, sending the CAI within the paging system; 4) at 244, relaying the disconnect signal, to the paging system to simulate the end of the incoming call; and 5) at 246, ending communication with the paging system. At 250, the paging system forwards the page and the CAI to the pager. The method ends at 252 but may be repeated as often as there are phone calls.

The preferred embodiments of the invented system, improvement and method are performed by programmable computer equipment using a link to telephone lines or other programmable telecommunication equipment. For example, a programmable general purpose microcomputer can connect an incoming telephone line to a paging system. This programmable computer may use software and hardware from Dialogic Corporation, of Parsippany, N.J. Specifically, DIALOGIC provides DTI/1xx interface boards (where xx=any two-digit number) for use in a microcomputer allowing attachment to a T-1 line and the paging company's equipment. The caller's telephone number may be extracted from an ANI transmission using DIALOGIC's interface boards and software. In addition, NewVoice, Inc. of Reston, Va., provides similar interface boards and software.

The equipment utilizing the preferred embodiment of the invented method may be incorporated into the paging system itself or may be a front-end processor or mechanism located upstream on the telephone line to allowing monitoring and intercepting of incoming telephone calls.

This invention can help with a problem encountered with public telephones and paging systems. Some public telephones cannot receive telephone calls, especially in crowded public places such as airports. However, a caller using such a telephone may be unaware of the phone's inability to receive calls and if the caller calls a pager through a paging system utilizing the preferred embodiment of the present invention, the caller may never receive a return phone call. This is because the subscriber may be unable to return the call based on the phone number received by the pager. To solve this problem, the caller can be informed that the phone from which the caller is calling or the phone number entered by the caller cannot receive a return phone call.

An additional filtering or screening feature may be provided by utilizing access to a computerized database via the invented method. After a caller's telephone number is identified (either based on ANI or based on caller input), the database may be searched based on the various known information, such as the caller's telephone number or the intended pager's phone number. The records being searched may include a tag (such as a textual message) and handling instructions.

A tag may be assigned to the caller's telephone number in relation to the intended pager. This tag along with any user programmable message can be forwarded to the pager along with or instead of the caller's telephone number. For example, the textual label "Terry" can be sent to an alpha pager instead of or along with Terry's telephone number.

Handling instructions inform the paging system on how it should manage calls. Such handling instructions may indicate, for example, that only pages from certain callers should be forwarded to the pager, that pages from specific callers should be blocked, that pages should be blocked or allowed based on the time or date of the call, that specific callers should get specific customized voice greetings or that calls should be routed to certain pagers depending upon the caller's number, the time of the call, and/or the phone number of the intended pager. Of course, the handling instructions may include other similar programmable management instructions.

While the present invention has been shown and described with reference to the foregoing preferred embodiments, it will be apparent to those skilled in the art that other changes in form and detail may be made therein without departing from the spirit and scope of the invention as defined in the appended claims.

I claim:

1. A method of automatically providing a telephone number of a caller to a paging system, wherein the caller originates an incoming telephone call to a designated pager through a paging system and that incoming call is transmitted across a telephone network to the paging system, wherein the paging system forwards the caller's telephone number with a page to the designated pager, the method comprising:

intercepting the incoming call before the call is received by the paging system, wherein the incoming call includes an automatic number identification (ANI) signal that includes the caller's telephone number, wherein the caller's telephone number in the ANI signal is automatically provided by the telephone network;

extracting the caller's telephone number from the ANI signal;

searching a database, using the caller's telephone number as an index, for caller information that has been stored therein prior to said intercepting of the incoming call;

establishing communication with the paging system and emulating a call to a paging system which is directed to the same designated pager to which the incoming call was directed, wherein the stored caller information includes information other than the caller's telephone number; and forwarding the caller's telephone number to the paging system to enable the paging system to send the caller's telephone number with the page to the designated pager and further forwarding to the paging system the caller's telephone number along with such caller information.

2. The method of claim 1 further comprising communicating with the caller.

3. The method of claim 2, wherein the communicating step includes generating paging system prompts.

4. The method of claim 2, wherein the communicating step includes acknowledging to the caller that the caller's telephone number has been extracted from the ANI signal.

5. The method of claim 1 further comprising accessing and searching a database that includes data records having caller-associated information (CAI) therein.

6. The method of claim 5 further comprising sending the CAI in the data records affiliated with the caller's telephone number.

7. The method of claim 5, wherein the data records include call handling instructions, the method further comprising blocking a call to the intended pager based upon the instructions found during a search of the data records.

8. The method of claim 5, wherein the data records include call handling instructions, the method further comprising routing a call to the intended pager based upon the instructions found during a search of the data records.

9. The method of claim 1 further comprising determining whether the caller manually enters a telephone number before termination of the incoming call and wherein the caller's telephone number extracted from the ANI signal is sent only if the caller does not manually enter a telephone number.

10. The method of claim 9 further comprising:

receiving a disconnect signal, wherein the disconnect signal indicates termination of the incoming call, and allowing the paging system to recognize the disconnect signal if the caller manually enters a telephone number.

11. The method of claim 9, further comprising receiving a disconnect signal, wherein the disconnect signal indicates termination of the incoming call, wherein the sending step includes:

capturing the disconnect signal, thereby preventing the paging system from recognizing termination of the incoming call;

establishing communication with the paging system;

forwarding the caller's telephone number with the page to the intended pager; and relaying the disconnect signal within the paging system to simulate the termination of the incoming call.

12. In a paging system including a public switched, telephone line-connected telephone answering equipment responsive to an incoming telephone call originated by a caller, the telephone call including an automatic number identification (ANI) signal having an indication of the telephone number of the telephone originating the incoming call, and the answering equipment further including paging equipment for communicating a telephone number of a caller to the intended pager, the improvement comprising:

decoding equipment including an operatively connected buffer, said decoding equipment being operatively connected to such answering equipment and to a telephone network so as to intercept incoming calls to an intended pager before such answering equipment receives the calls, said decoding equipment monitoring such telephone line to intercept an incoming call and decode such call's accompanying ANI signal, said decoding equipment automatically relaying the caller's telephone number to such paging equipment, wherein the caller's telephone number was decoded from the ANI signal, said decoding equipment automatically relaying along with the caller's telephone number caller information which has been recorded, prior to such intercepting of incoming calls, in said buffer, wherein the recorded caller information includes information other than the caller's telephone number.

13. The improvement of claim 12, wherein said decoding equipment includes a buffer for temporarily storing the caller's telephone number until it is relayed to such paging equipment.

14. The improvement of claim 12, which further comprises messaging equipment operatively connected with said decoding equipment and with such telephone line, said messaging equipment enabling communication with the caller.

15. A method of automatically providing a telephone number of a caller to a paging system, wherein the caller originates an incoming telephone call to an intended pager through a paging system and that incoming call is transmitted across a telephone network to the paging system, caller's telephone number with a page to the intended pager, the method comprising:

intercepting the incoming call before the call is received by the paging system, wherein the incoming call includes an automatic number identification (ANI) signal that includes the caller's telephone number, wherein the caller's telephone number is not manually provided by the caller;

extracting the caller's telephone number from the ANI signal;

searching a database, using the caller's telephone number as an index, for caller information that has been stored therein prior to said intercepting of the incoming call;

establishing communication with the paging system and emulating a call to a paging system which is directed to the same intended pager to which the incoming call was directed, wherein the stored caller information includes information other than the caller's telephone number; and forwarding the caller's telephone number to the paging system and further forwarding to the paging system along with the caller's telephone number such caller information as is produced by said database searching to enable the paging system to send the caller's telephone number along with such caller information with the page to the intended pager.

* * * * *